(12) United States Patent
Holstein et al.

(10) Patent No.: US 7,014,753 B2
(45) Date of Patent: Mar. 21, 2006

(54) SALT CHLORINE GENERATOR

(75) Inventors: Richard Holstein, Jackson, NJ (US); Joseph Hui, Cupertino, CA (US)

(73) Assignee: Smartpool Inc., Lakewood, NJ (US)

( * ) Notice: Subject to any disclaimer, the term of this patent is extended or adjusted under 35 U.S.C. 154(b) by 0 days.

(21) Appl. No.: 10/895,374

(22) Filed: Jul. 21, 2004

(65) Prior Publication Data
US 2005/0029118 A1 Feb. 10, 2005

Related U.S. Application Data

(60) Provisional application No. 60/488,445, filed on Jul. 21, 2003.

(51) Int. Cl.
*C02F 1/461* (2006.01)
*C01B 7/03* (2006.01)
*E04H 4/12* (2006.01)

(52) U.S. Cl. .................. 210/136; 210/167; 210/169; 210/748; 210/192; 210/416.2; 204/157.48; 4/507

(58) Field of Classification Search ............ 210/136, 210/169, 748, 416.1, 192, 416.2, 167, 753, 210/754; 204/157.48, 660, 672, 673; 4/507
See application file for complete search history.

(56) References Cited

U.S. PATENT DOCUMENTS

| | | | | |
|---|---|---|---|---|
| 2,887,444 A | * | 5/1959 | Lindstaedt | 210/748 |
| 3,222,269 A | | 12/1965 | Stanton | |
| 3,351,542 A | * | 11/1967 | Oldershaw et al. | 210/748 |
| 3,476,675 A | | 11/1969 | Colvin et al. | |
| 3,578,023 A | * | 5/1971 | Diemond et al. | 137/592 |
| 4,100,052 A | * | 7/1978 | Stillman | 204/268 |
| 4,419,207 A | | 12/1983 | Bindon | |
| 4,525,253 A | * | 6/1985 | Hayes et al. | 210/748 |
| 4,613,415 A | * | 9/1986 | Wreath et al. | 205/335 |
| 4,714,534 A | * | 12/1987 | Fair et al. | 204/269 |
| 4,767,511 A | * | 8/1988 | Aragon | 210/743 |
| 4,861,451 A | | 8/1989 | David | |
| 4,997,540 A | | 3/1991 | Howlett | |
| 5,221,444 A | * | 6/1993 | Silveri | 210/746 |
| 5,228,964 A | * | 7/1993 | Middleby | 204/194 |
| 5,314,589 A | * | 5/1994 | Hawley | 205/618 |
| 5,326,443 A | * | 7/1994 | Hilbig | 210/97 |
| 5,460,706 A | * | 10/1995 | Lisboa | 204/269 |
| 5,885,426 A | * | 3/1999 | Silveri | 204/212 |
| 5,993,669 A | * | 11/1999 | Fulmer | 210/716 |

(Continued)

*Primary Examiner*—Fred G. Prince
(74) *Attorney, Agent, or Firm*—Birch, Stewart, Kolasch & Birch, LLP

(57) ABSTRACT

An electrolytic cell combined into a unitary structure with a liquid circulation fitting, which purifies water by electrode plates inside the cell when an aqueous solution is present. The unitary structure replaces the existing water return fitting. This integrated structure is well suited for use in pools, tubs, spas, fountains or similar large liquid containers. The production of halogen inside the structure is not required to coincide with the cycle of the existing pool filtration system. Rather, the electrodes receive a continuous supply of low level power and the halogen produced inside the structure is disbursed back into the body of water through the fitting using an integrated, dedicated circulation pump, special channels in the surface and a check valve to insure one directional flow from the pool pump and natural convection. Using fresh water drawn from the vessel, halogen is then disbursed back into the vessel with the water at a location different from where the fresh water was drawn. The level of halogen production may be regulated using a timing mechanism and/or sensors in the circuitry.

25 Claims, 2 Drawing Sheets

U.S. PATENT DOCUMENTS

| | | | |
|---|---|---|---|
| 6,287,466 B1 * | 9/2001 | Yassin | 210/198.1 |
| 6,391,167 B1 * | 5/2002 | Grannersberger | 204/228.3 |
| 6,625,824 B1 * | 9/2003 | Lutz et al. | 4/507 |
| 6,827,847 B1 * | 12/2004 | Chauvier | 210/138 |
| 2002/0020675 A1 * | 2/2002 | Herrington et al. | 210/748 |
| 2002/0021990 A1 * | 2/2002 | Cowley et al. | 422/187 |

* cited by examiner

SALT CHLORINE GENERATOR

This Non-provisional application claims priority under 35 U.S.C. § 119(e) on U.S. Provisional Application No(s). 60/488,445 filed on Jul. 21, 2003, the entire contents of which are hereby incorporated by reference.

BACKGROUND OF THE INVENTION

1. Field of the Invention

The present invention relates to a combination of a halogen producing electrolytic cell, a circulation pump, a directional flow check valve and a liquid circulation fitting formed as a unitary structure or as individual components.

2. Description of Background Art

Disinfection of pools, spas hot tubs, fountains or other large vessels of recirculated water is accomplished by the addition of halogen type disinfectants or by halogen generated within a cell inserted into the plumbing of the filtration loop.

These halogen generation systems generally require 1) cutting or adding the generation cell to the filtration pipe loop or 2) attaching the cell to existing fittings within the body of water.

A common difficulty of the first type is the high cost and large size of the electrodes, which require extensive electronic monitoring equipment to insure safety and proper disinfection. These systems require that the operation of the electrodes inside the cell coincide with the operation of the existing circulation pump. Sensors must be used to ensure circulation and to accommodate the entrapment of gases produced during the generating process. The second type of system requires the immersion of electrodes under the surface of the water either attached to the inside of the vessel wall or attached to an existing fitting inside the vessel. The difficulty with this embodiment is the necessity to insert wiring through the vessel wall and route wires through existing pool piping which precludes access to the wires for service or replacement and the difficulty in removal of electrodes plates for replacement or cleaning.

In addition to the drawbacks outlined above, the existing systems require a high initial purchase price due to the large size of the cell and the electronic monitoring sensors required for operation. Further, the costs associated with the hiring of specialized contractors to complete the installation and to service the unit are substantial.

SUMMARY OF THE INVENTION

It will be appreciated that there is a need for a low cost, easily installed electrolytic cell that produces halogen disinfectants without hiring specialized contractors and eliminates the necessity of extensive monitoring equipment. Ideally the design should provide for the constant disbursement of disinfectant into the body of water which maximizes performance; at a much lower cost to consumers due to smaller electrodes and is capable of self installation; ease of maintenance and a unitized fitting that easily replaces all existing water circulation fittings for which it is designated.

These and other objects of the present invention are achieved by a combination of a halogen producing electrolytic cell, a directional check valve, a circulation pump and a liquid circulation fitting formed as a unitary structure or as individual components.

In one preferred embodiment, the liquid circulation fitting is a return water inlet fitting formed integrally as a unitary structure with a halogen producing electrolytic cell to be installed in a single opening in the wall of a pool, spa, hot tub or other vessel. It is to be understood that the present invention may be constructed as individual components assembled along a hose or other conduit to achiever the results of the present invention. The cell also contains an integrated, dedicated circulation pump inside the unitary structure as well as a directional check valve.

The unitary structure also includes means for adjustably mounting the device in vessels having walls of various thicknesses. Therefore the structure of the invention can be installed conveniently in existing wall openings used for water return inlet fittings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
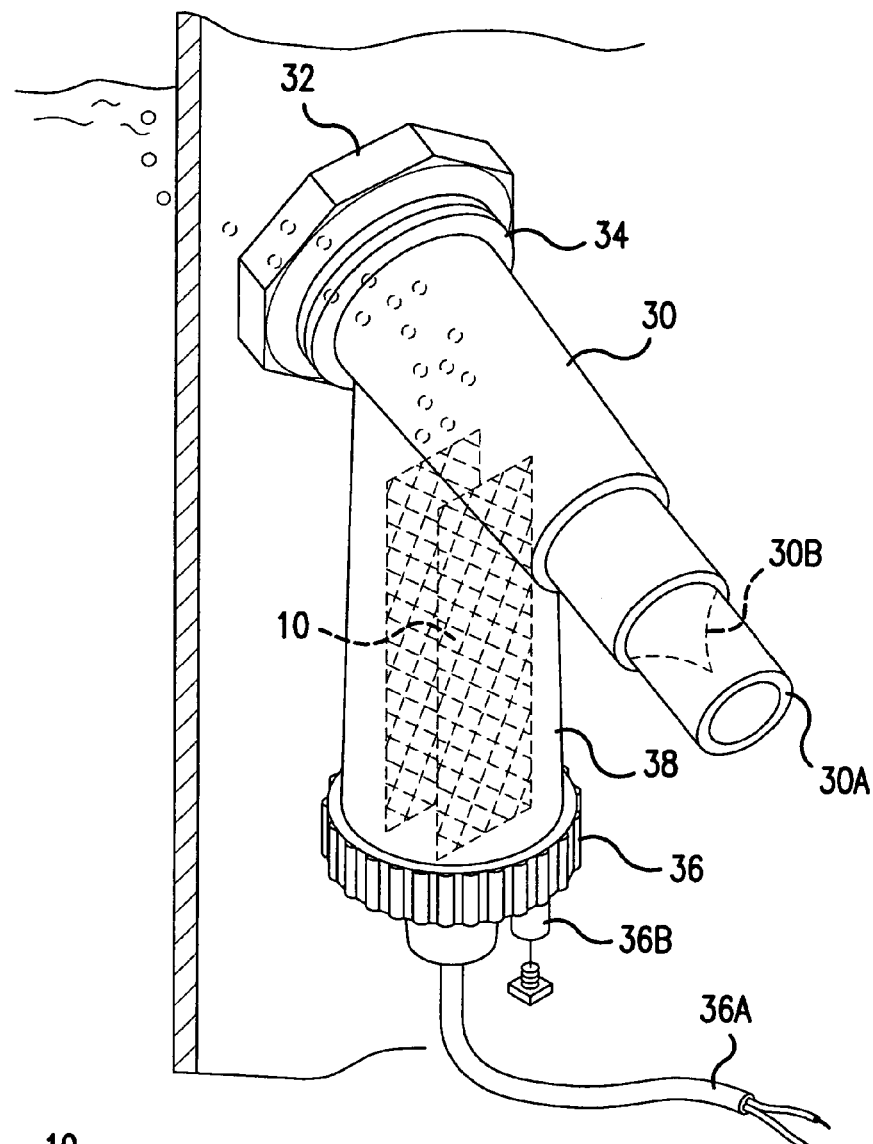
FIG. 1 is perspective view illustrating a housing for containing a halogen producing electrolytic cell, a circulating pump, a directional check valve and a liquid circulation fitting formed as a unitary structure.
Figure 2:
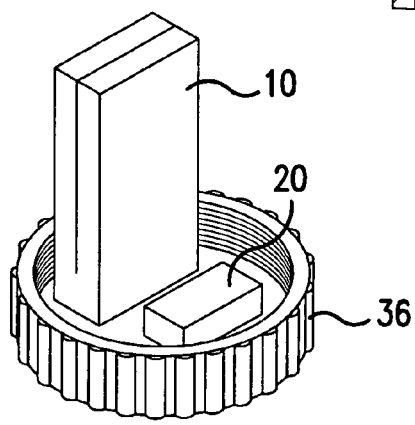
FIG. 2 is view illustrating the electrodes and the circulating pump of the present invention removed from the housing.

As illustrated in FIGS. 1 and 2, the present invention resides in a combination of a halogen producing electrolytic cell 10, a circulation pump 20, a directional check valve 30B and a liquid circulation fitting 30 formed as a unitary structure. It is to be understood that the components may be arranged as individual components.

In one preferred embodiment, the liquid circulation fitting 30 is a return water inlet fitting formed integrally as a unitary structure with a halogen producing electrolytic cell 10 to be installed in a single opening 32 in the wall of a pool, spa, hot tub or other vessel. The halogen producing electrolytic cell 10 also contains an integrated, dedicated circulation pump 20 inside the unitary structure.

A one-way check valve 30B is provided to permit a full flow of water through the structure only when the pool pump is in operation. When the pool pump is not operating, fresh water is drawn by the circulating pump within the structure from a special channel within the structure. This configuration assures a fresh supply of aqueous solution to the impellers of the circulating pump and eliminates the possibility of recycling the same water within the circulating pump.

The unitary structure also includes a connector means 34 for adjustably mounting the device in vessels having walls of various thicknesses. Therefore the structure of the present invention can be installed conveniently in existing wall openings used for water return inlet fittings.

In the unitary structure, the means for circulating water within the structure provides movement of water from the body of water, through the structure and back into the body of water. This circulation is accomplished through special channels within the structure in combination with a dedicated integral circulation pump 20 and the natural convection movement of elements formed during electrolysis. A check valve 30B is integrated at the entrance into the structure which allows full flow of water through the structure only when the pool pump is in operation. When the pool pump is in operation, fresh water is supplied to the structure by that means. When the pool pump is not operating, fresh water is drawn by the circulating pump within the structure from a special channel within the structure. This configuration assures a fresh supply of aqueous solution to the impeller of the circulation pump and eliminates the possibility of recycling the same water within the liquid circulation fitting 30. This is all accomplished without the need for specialized sensors or electronics.

Low voltage power is provided to the components through a transformer provided as part of the system. The system may be connected to an existing GFCI electrical outlet utilizing a common 3-prong plug or twist-lock plug commonly used around pools, spas, hotels, fountains or other vessels. If preferred, a licensed electrician can also make the electrical connection by connecting wires directly onto a GFCI circuit. A transformer is provided together with the system for producing low voltage for supplying power for operating the salt chlorine generator.

The water line fitting will accommodate any of the commonly sized hoses or PVC fittings used within the filtration loop.

A specialized plug is provided to block the circulation fitting and a drain plug 36B on the bottom of the structure allow for easy draining of the structure. Access to electrodes and circulating pump for service, cleaning or replacement are accomplished by a threaded bottom lid 36 on the structure, which, once the structure is drained, may be easily removed by hand and threaded back onto the body 38 once the required maintenance has been performed.

By retaining a standard return fitting configuration inside the vessel wall (wet side), the ability to attach standard automatic cleaning equipment or manual cleaning equipment to the fitting is not compromised nor are any special adapters required.

Figure 3:
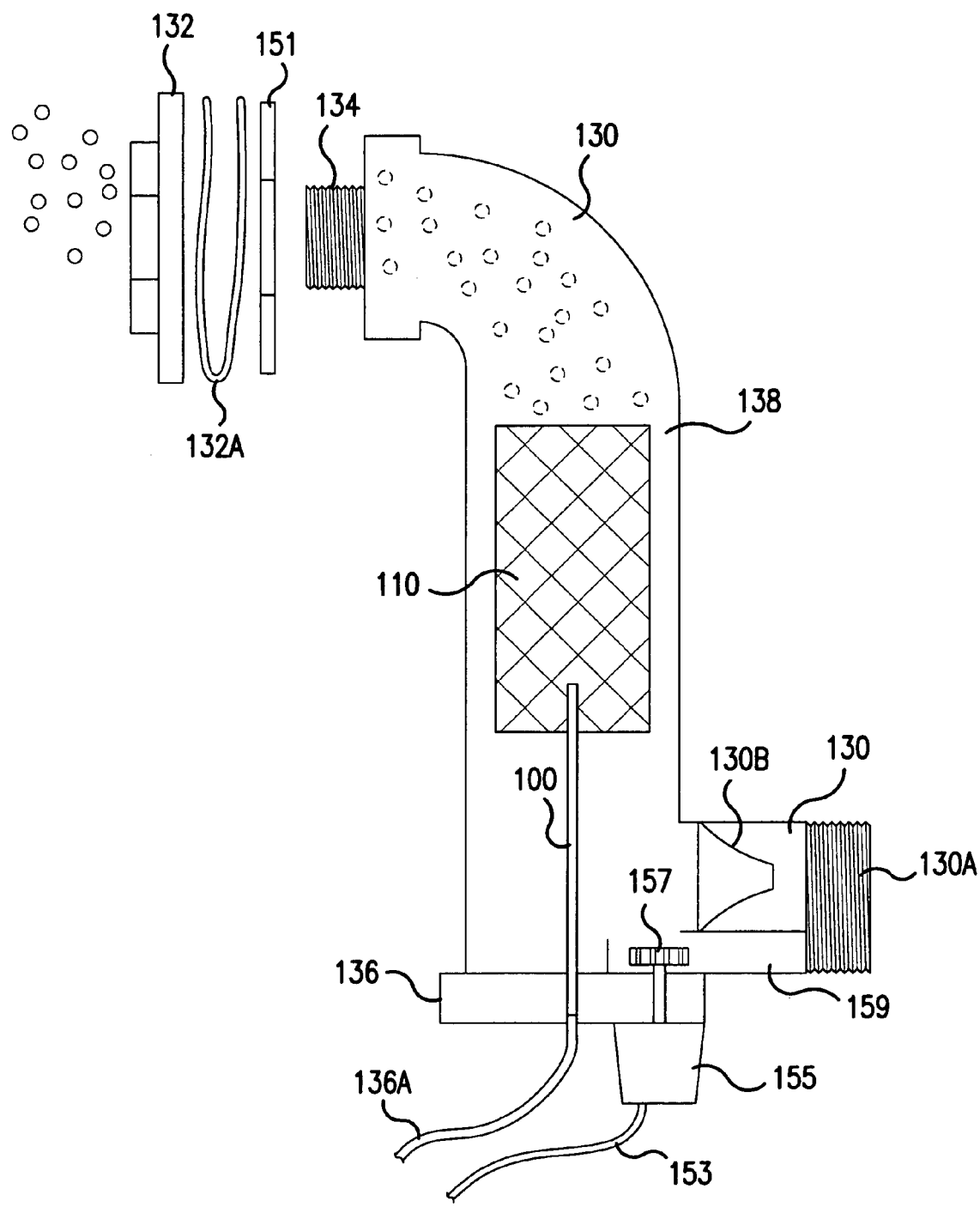
FIG. 3 is a perspective view illustrating a second embodiment of the present invention that includes a housing for containing a halogen producing electrolytic cell, a circulating pump, a directional check valve and a liquid circulation fitting formed as a unitary structure.

As illustrated in FIG. 3, a second embodiment of the present invention resides in a combination of a halogen producing electrolytic cell 110, a circulation pump 155, 157, a directional check valve 130B and a liquid circulation fitting 130 formed as a unitary structure.

The liquid circulation fitting 130 is a return water inlet fitting formed integrally as a unitary structure with a halogen producing electrolytic cell 110 to be installed in a single opening in the wall of a pool, spa, hot tub or other vessel. The halogen producing electrolytic cell 110 also contains an integrated, dedicated circulation pump 150 mounted on the lid 136. The circulation pump 150 is operatively connected to an impeller 157 for circulating water within the liquid circulation fitting 130.

A one-way check valve 130B is provided to permit a full flow of water through the structure only when the pool pump is in operation. When the pool pump is not operating, fresh water is drawn by the circulating pump within the structure from a special channel 159 within the structure. This configuration assures a fresh supply of aqueous solution to the impeller 157 of the circulating pump and eliminates the possibility of recycling the same water within the circulating pump.

The unitary structure also includes a connector means 134 which may be a threaded fitting on the liquid circulation fitting 130 for adjustably mounting the device in vessels having walls of various thicknesses. A gasket 132A is mounted between the connector means 134 and a fastener nut 132 for securing the liquid circulation fitting 130 to a sidewall of a pool. The structure of the present invention can be installed conveniently in existing wall openings used for water return inlet fittings.

In the second embodiment, the means for circulating water within the structure provides movement of water from the body of water, through the structure and back into the body of water. This circulation is accomplished through special channels within the structure in combination with a dedicated circulation pump 155 that is provided with a supply of low voltage through electrical line 153 and the natural convection movement of elements formed during electrolysis.

A check valve 130B is integrated at the entrance into the structure which allows full flow of water through the structure only when the pool pump is in operation. When the pool pump is not operating, fresh water is drawn by the circulating pump within the structure from a special channel 159 within the structure. This configuration assures a fresh supply of aqueous solution to the impeller 157 of the circulation pump 155 and eliminates the possibility of recycling the same water within the liquid circulation fitting 130. This is all accomplished without the need for specialized sensors or electronics.

In the second embodiment, low voltage power of approximately 7 volts and 5 amps is provided to the components through a transformer provided as part of the system. The system may be connected to an existing GFCI electrical outlet utilizing a common 3-prong plug or twist-lock plug commonly used around pools, spas, hotels, fountains or other vessels. If preferred, a licensed electrician can also make the electrical connection by connecting wires directly onto a GFCI circuit. A transformer is provided together with the system for producing low voltage for supplying power for operating the salt chlorine generator.

In the second embodiment, the water line fitting will accommodate any of the commonly sized hoses or PVC fittings used within the filtration loop.

A threaded bottom lid 136 is provided to block the circulation fitting. By removing the threaded bottom lid 136 on the bottom of the structure allows for easy draining of the structure. Access to electrodes and the circulating pump for service, cleaning or replacement are accomplished by the threaded bottom lid 136 on the structure, which, once the structure is drained, may be easily removed by hand and threaded back onto the body 138 once the required maintenance has been performed.

Both embodiments of the present invention provide an electrolytic cell that is combined into a unitary structure with a liquid circulation fitting for purifying water by electrode plates inside the cell when an aqueous solution is present. The unitary structure can replace the existing water return fitting and is well suited for use in pools, tubs, spas, fountains or similar large liquid containers. It is to be understood that the components may be individually arranged relative to each other and do not need to be positioned within a unitary structure to produce the desired result.

The production of halogen inside the structure does not coincide with the cycle of the existing pool filtration system. The electrodes of the present invention receive a continuous supply of low level power and the halogen produced inside the structure is disbursed back into the body of water through the fitting using an integrated, dedicated circulation pump, special channels in the surface and a check valve to insure one directional flow from the pool pump and natural convection.

The level of halogen production may be regulated using a timing mechanism (not illustrated). The liquid circulation fitting allows for a smaller and less expensive unit and eliminates the need for a gas trap chamber or flow sensor within the structure. Because the components are outside the vessel wall of the pool, spa or hot tub, access to the components for cleaning and maintenance are simplified. The structure allows for a connection to the pool filtration system using either a clamped hose connection or a PVC pipe connection. Further, the installation may be undertaken by most homeowners and does not require any special tools or training.

In operation, water would be connected to the inlet 30A, 130A for supplying water to the pool, spa or hot tub or other vessel. A portion of the water would come into contact with the halogen producing electrolytic cell 10, 110 for generating chlorine for being supplied to the pool, spa or hot tub or other vessel. The liquid circulation fitting 30, 130 includes a circulation pump 20, 155 for ensuring that a constant flow of fresh water is presented to the halogen producing electrolytic cell 10, 110 for generating chlorine. A continuous level of chlorine will be generated to ensure that the appropriate level of chlorine is present in the pool, spa or hot tub or other vessel without the need for turning on the pool or spa pump.

The halogen producing electrolytic cell 10, 110 and the circulation pump 20, 155 are supplied with a low voltage source of power of approximately 0.3 A/sq.in. at 2–12V. A timer or other circuitry may be connected to the halogen producing electrolytic cell 10, 110 and the circulation pump 20, 155 to permit the unit to be periodically turned on and off or to adjust the level of output to the electrolytic cell.

A one-way valve 30B, 130B is provided to ensure that water is supplied to the liquid circulation fitting 30, 130 and is not discharged from the liquid circulation fitting 30, 130. If water is not being supplied to the liquid circulation fitting 30, 130 by the pool or spa pump, the circulation pump 20, 155 is continuously activated to ensure that water within the pool, spa or hot tub or other vessel is circulated through special channels to permit the water to be passed over the halogen producing electrolytic cell 10, 110 permitting chlorine to be generated.

The present invention provides a means for chlorinating a pool when the pool pump is actuated and when the pool pump is turned off. The present invention includes a separate pump to permit chlorine to be introduced into the pool, spa or hot tub or other vessel regardless of the operation of the conventional pool pump.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A salt chlorine generator for use in conjunction with a water circulation system in a pool, spa, hot tub or large vessel of water comprising:
    a halogen-producing electrode configuration;
    a circulation pump for installation above or below water level in a pool, spa, hot tub or large body of water;
    a directional check valve;
    a return water inlet fitting for connection to a source of water for supplying chlorine to the water, and
    a bottom threaded to the salt chlorine generator for providing access to a disinfecting source and the circulating pump for service and replacement.

2. A salt chlorine generator for use in conjunction with a water circulation system in a pool, tub or spa comprising:
    a disinfecting assembly including a halogen-producing electrode configuration and a circulation pump for installation beneath a water level in a pool, tub or spa;
    a return water inlet fitting for connection to a water circulation system, to return circulating water to the pool, wherein the disinfecting assembly and the return water inlet fitting form a unitary structure for attachment to a single opening in a wall of the pool, tub or spa;
    a water line fitting for coupling the circulation system to an opening in the return water inlet fitting;
    a directionally adjustable port surrounding the disinfecting assembly on the inside of the pool, tub or spa;
    whereby the circulating water emerges from the port in any desired direction.

3. The salt chlorine generator according to claim 2, wherein the water line fitting can accommodate any of a plurality of water line sizes.

4. A salt chlorine generator for use in conjunction with a water circulation system in a pool, tub or spa comprising:
    a disinfecting assembly including a halogen-producing electrode configuration and a circulation pump for installation beneath a water level in a pool, tub or spa; and
    a return water inlet fitting for connection to a water circulation system, to return circulating water to the pool, wherein the disinfecting assembly and the return water inlet fitting form a unitary structure for attachment to a single opening in a wall of the pool, tub or spa.

5. For use in conjunction with a liquid circulation system in a liquid container, a combination comprising:
    a disinfecting assembly including a halogen-producing electrode configuration and a circulation pump for installation in a liquid container;
    a liquid circulation fitting through which fluid flows to or from a port in the container, wherein the disinfecting assembly and the circulation fitting form a unitary structure for installation in the liquid container; and
    a pipe fitting for coupling to an opening in the liquid circulation fitting;
    whereby the circulating liquid emerges from the port in any desired direction.

6. The combination according to claim 5, wherein the pipe fitting can accommodate any of a plurality of liquid pipe sizes.

7. A salt chlorine generator for use in conjunction with a liquid circulation system in a liquid container comprising:
    a disinfecting assembly including a halogen-producing electrode configuration and a circulation pump for installation in a liquid container; and a liquid circulation fitting through which fluid flows to or from the container, wherein the disinfecting assembly and circulation fitting form a unitary structure for installation in the liquid container.

8. A disinfecting assembly, including a halogen-producing electrode configuration, a circulation pump, and a water inlet assembly for installation in an opening through the wall of a pool, tub or spa, the wall having a forward surface facing into the water and an oppositely-facing rear surface, the assembly comprising:

an inlet housing having a generally tubular body insertable into the opening in the wall to a position extending therethrough;

clamping and sealing means connected to the body, having front and rear portions abutting the forward and rear surfaces of the wall, respectively, for clamping the inlet housing fixedly in position in the opening in the wall and sealing against passage of water between the exterior of the body of the wall opening, at least one of the portions of the clamping means being movable to a position permitting placement of the body into and through the opening;

a generally tubular disinfecting housing insertable into the inlet housing, the disinfecting housing being sealingly mounted across an open forward end of the disinfecting housing;

a disinfecting member mounted within the disinfecting housing for disinfecting water;

front supporting means and rear supporting means connecting forward and rear ends of the disinfecting housing to forward and rear regions of the inlet housing, respectively, for supporting the disinfecting housing within the inlet housing with spaced regions between them to form a generally annular water passage between the inlet housing and the disinfecting housing;

sealing means extending between the inlet housing and the disinfecting housing for creating a closed rear end to the water passage;

at least one port between the inlet housing and the disinfecting housing for placing a forward end of the water passage in communication with the pool; and means for connecting a water inlet conduit to the inlet housing for supplying water to the water passage.

9. The assembly according to claim 8, wherein:
one of the portions of the clamping and sealing means comprises a first flange fixedly connected to the body extending radially therefrom and abutting one of the forward and rear surfaces of the wall around the opening; and
the other portion of the clamping and sealing means comprises a second flange, the second flange having a surface overlapping the periphery of the opening in the wall and abutting the opposite surface of the wall around the opening; and
a threaded region for engaging a correspondingly threaded region of the body of the inlet housing.

10. The assembly according to claim 9, wherein the threaded regions of the second flange and the tubular body are of a sufficient axial extent to accommodate pool walls of various thicknesses.

11. The assembly according to claim 10, wherein:
the second flange has a surface abutting the forward surface of the pool wall;
the generally tubular body includes an axially extending, threaded stem projecting rearwardly from the surface; and the second flange is threaded to engage the stem, the stem having a central opening extending through the second flange to constitute a portion of the water passage.

12. The assembly according to claim 8, wherein:
the front supporting means includes:
a rearwardly facing engagement surface on the disinfecting housing adjacent its forward end; and
an abutment surface connected with the inlet housing for engaging the engagement surface on the disinfecting housing to limit rearward movement thereof through the inlet housing;
and wherein the rear supporting means includes:
an annular shoulder at the rear of the inlet housing having a central opening to support the rear end of the disinfecting housing;
a threaded region of the inlet housing to receive the extending threaded stem of the disinfecting housing; and
a securing member engaging the threaded region of the disinfecting housing to bear against the annular shoulder and draw the engagement surface of the disinfecting housing firmly against the abutment surface.

13. The assembly according to claim 12, wherein the sealing means comprises an annular resilient seal carried by one of the inlet housing and the disinfecting housing, extending into peripherally continuous sealing contact with the other of the inlet housing and the disinfecting housing.

14. The assembly according to claim 8, wherein:
the disinfecting source is housed within a unitary structure with electrical connections extending rearwardly therefrom; and
wherein the disinfecting housing includes a generally tubular region extending rearwardly; and
supporting means supporting the disinfecting source within the sealed unit with the electric connections extending rearwardly through the tubular region.

15. The assembly according to claim 8, wherein:
the front supporting means includes a water inlet annulus extending around and engaging a forward region of the disinfecting housing, the annulus being spaced forwardly of the inlet housing extending into contact therewith; and
the annulus has at least one port for directing water from the water passage into the pool.

16. The assembly according to claim 15, wherein the water inlet annulus is mounted for rotation to enable the direction of water entering the pool through the port to be varied.

17. A salt chlorine generator for use in a combined disinfecting and water inlet assembly of the type having an inlet housing extending through an opening in a pool wall, internal sealing regions within the inlet housing for limiting internal water flow and a threaded securing member positioned adjacent and externally of a rear end of the inlet housing, a replaceable disinfecting unit comprising:

a disinfecting source with electrical connections extending rearwardly therefrom;
a disinfecting housing enclosing the disinfecting source, the disinfecting housing including:
a generally conical region extending around and partially enclosing the disinfecting source;
a generally tubular portion extending rearwardly from the disinfecting housing;
supporting means mounted within the disinfecting housing for supporting the disinfecting source in position within the conical region with the electrical connections extending through the tubular portion rearward from the supporting means;

a threaded region extending from the tubular portion of the disinfecting housing adjacent its rear end, for engagement with the securing member of the inlet housing; and a sealing ring mounted on the disinfecting housing and projecting outwardly therefrom for engagement with internal sealing regions of the inlet housing.

18. A method of mounting a combined disinfecting and water inlet assembly in an opening through a wall of a pool, the wall having a forward side facing into the interior of the pool and an oppositely facing rear side, the assembly including an inlet housing having a generally tubular body insertable into the opening in the wall to extend therethrough, and front and rear clamping portions connected to the body on opposite sides of the wall for clamping the inlet housing fixedly in position in the opening, at least one of the portions initially being separate from the body to permit placement of the body into and through the opening and then being attached to the body to participate in clamping the body to the wall, a disinfecting housing insertable into and through the inlet housing up to a predetermined position at which its further rearward movement is arrested, and a connecting mechanism connecting the disinfecting housing to the inlet housing adjacent its rear end, the method comprising the steps of:

installing the inlet housing, with the one clamping portion separated from it, into the opening until the other clamping portion comes into abutment with the wall;

attaching the one clamping portion to the body against the other side of the wall to clamp the inlet housing in place;

inserting the disinfecting housing from the front side of the wall rearwardly through the inlet housing until its further rearward movement is arrested; and connecting the disinfecting housing adjacent its rear end to the inlet housing adjacent its rear end, to fixedly secure the disinfecting and inlet housings together.

19. A salt chlorine generator for use in conjunction with a water circulation system in a pool, tub or spa, a combination comprising:

a disinfecting assembly for installation in a pool, tub or spa;

a return water inlet fitting for connection to a water circulation system, to return circulating water to the pool, wherein the disinfecting assembly and the return water inlet fitting form a unitary structure for attachment to a single opening in a wall of the pool, tube or spa; and a water line fitting for coupling the circulation system to an opening in the return water inlet fitting.

20. A salt chlorine generator for use in conjunction with a liquid circulation system in a liquid container, a combination comprising:

a disinfecting assembly for installation in a port in a liquid container;

a liquid circulation fitting through which fluid flows to or from the container, wherein the disinfecting assembly and the circulation fitting form a unitary structure for installation in the liquid container; and a pipe fitting for coupling to an opening in the liquid circulation fitting;

whereby the circulating liquid emerges from the port in any desired direction.

21. A combined pool disinfecting and water inlet assembly for installation in an opening through the wall of a pool, tub or spa, the wall having a forward surface facing into the water and an oppositely-facing rear surface, the assembly comprising:

an inlet housing having a generally tubular body insertable into the opening in the wall to a position extending therethrough;

means for removably attaching the tubular body in sealing contact with the opening;

a generally tubular disinfecting housing insertable into the inlet housing; and a disinfecting source mounted to direct disinfectant through tubular disinfecting housing;

means for supporting the tubular disinfecting housing within the inlet housing with spaced regions between them to form a generally annular water passage between the inlet housing and the disinfecting housing;

sealing means extending between the inlet housing and the disinfecting housing, for creating a closed rear end to the water passage;

at least one port between the inlet housing and the disinfecting housing for placing a forward end of the water passage in communication with the pool; and means for connecting a water inlet conduit to the inlet housing for supplying water to the water passage.

22. A combined pool disinfecting and water inlet assembly for installation in an opening through the wall of a pool, tub or spa, the wall having a forward surface facing into the water and an oppositely-facing rear surface, the assembly comprising:

an inlet housing having a generally tubular body insertable into the opening in the wall to a position extending therethrough;

means for removably attaching the tubular body in sealing contact with the opening;

a generally tubular disinfecting housing insertable into the inlet housing; and a disinfecting source mounted to direct disinfectant through tubular disinfecting housing;

means for supporting the tubular disinfecting housing within the inlet housing with spaced regions between them to form a generally annular water passage between the inlet housing and the disinfecting housing;

a threaded, removable bottom mounted on an end of the disinfecting housing for providing access to the disinfecting housing for service and replacement of elements disposed within the disinfecting housing;

at least one port between the inlet housing and the disinfecting housing for placing a forward end of the water passage in communication with the pool; and means for connecting a water inlet conduit to the inlet housing for supplying water to the water passage.

23. A salt chlorine generator for use in conjunction with a water circulation system in a pool, spa, hot tub or large vessel of water comprising:

a halogen-producing electrode configuration;

a circulation pump for installation below a water level in a pool, spa, hot tub or large body of water;

a return water inlet fitting for connection to a source of water for supplying chlorine to the water; and a bottom threaded to the salt chlorine generator for providing access to a disinfecting source and the circulating pump for service and replacement.

24. The salt chlorine generator for use in conjunction with a water circulation system in a pool, spa, hot tub or large vessel of water according to claim 23, wherein the return water inlet fitting includes a liquid circulation fitting for housing the halogen-producing electrode and a water supply inlet for supplying water to the salt chlorine generator, said water supply inlet being disposed at an angle relative to the housing for the halogen-producing electrode.

25. The salt chlorine generator for use in conjunction with a water circulation system in a pool, spa, hot tub or large vessel of water according to claim 23, wherein the return water inlet fitting includes a liquid circulation fitting for housing the halogen-producing electrode and a water supply inlet for supplying water to the salt chlorine generator, said water supply inlet being disposed at an angle of substantially ninety degrees relative to the housing for the halogen-producing electrode.

* * * * *